US010353530B1

(12) United States Patent
Truong et al.

(10) Patent No.: US 10,353,530 B1
(45) Date of Patent: Jul. 16, 2019

(54) LAPTOP-TO-TABLET MODE ADAPTATION

(71) Applicant: Google Inc., Mountain View, CA (US)

(72) Inventors: Steven Chi Truong, Toronto (CA); Alexander Friedrich Kuscher, San Francisco, CA (US); Jennifer Shien-Ming Chen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 442 days.

(21) Appl. No.: 15/295,962

(22) Filed: Oct. 17, 2016

Related U.S. Application Data

(63) Continuation of application No. 14/283,036, filed on May 20, 2014, now Pat. No. 9,471,201.

(51) Int. Cl.
| | | |
|---|---|---|
| *G06F 3/048* | (2013.01) | |
| *G06F 3/0481* | (2013.01) | |
| *G06F 3/0488* | (2013.01) | |
| *G06F 3/0484* | (2013.01) | |
| *G06F 3/0482* | (2013.01) | |
| *G06F 1/16* | (2006.01) | |

(52) U.S. Cl.
CPC .......... *G06F 3/0481* (2013.01); *G06F 1/1618* (2013.01); *G06F 1/1643* (2013.01); *G06F 1/1677* (2013.01); *G06F 3/0482* (2013.01); *G06F 3/04812* (2013.01); *G06F 3/04817* (2013.01); *G06F 3/04845* (2013.01); *G06F 3/04883* (2013.01); *G06F 2203/04803* (2013.01)

(58) Field of Classification Search
CPC .... G06F 3/0481; G06F 1/1618; G06F 1/1643; G06F 1/1677; G06F 3/04812; G06F 3/04817

USPC ......................................................... 715/773
See application file for complete search history.

(56) References Cited

U.S. PATENT DOCUMENTS

| | | |
|---|---|---|
| 8,289,688 B2 | 10/2012 | Behar et al. |
| 8,577,957 B2 | 11/2013 | Behar et al. |
| 8,635,543 B2 | 1/2014 | Dingle et al. |
| 9,001,149 B2 | 4/2015 | Sirpal et al. |

(Continued)

FOREIGN PATENT DOCUMENTS

| | | |
|---|---|---|
| CN | 1854990 A | 11/2006 |
| EP | 1645939 A2 | 4/2006 |

*Primary Examiner* — David Phantana-angkool
(74) *Attorney, Agent, or Firm* — Morgan, Lewis & Bockius LLP

(57) ABSTRACT

According to one embodiment of the present disclosure a computer-implemented method for automatically transitioning a user interface in a personal computing device between a laptop mode and a tablet mode is provided. The method includes detecting a hardware configuration change in the personal computing device. When the hardware configuration changes to a tablet mode, the method includes maximizing an active window in a display of the personal computing device and maximizing a second, inactive window, underneath the active window. And when the hardware configuration changes to a laptop mode, the method includes configuring the user interface to a windows icons menus and pointers (WIMP) mode. According to one embodiment of the present disclosure, a personal computing device having a base portion coupled to a display portion is provided. The personal computing device is configured to perform a computer-implemented method as described above.

20 Claims, 13 Drawing Sheets

(56) References Cited

U.S. PATENT DOCUMENTS

| | | | |
|---|---|---|---|
| 9,003,315 B2* | 4/2015 | Behar | G06F 1/162 |
| | | | 715/764 |
| 9,471,201 B1* | 10/2016 | Truong | G06F 3/0485 |
| 9,501,287 B2* | 11/2016 | Waltermann | G06F 9/4401 |
| 9,507,508 B2* | 11/2016 | Park | G06F 3/0481 |
| 9,588,927 B2* | 3/2017 | Li | G06F 13/385 |
| 9,952,743 B2* | 4/2018 | Sirpal | G06F 1/1616 |
| 2009/0244012 A1 | 10/2009 | Behar et al. | |
| 2012/0162058 A1 | 6/2012 | Davis et al. | |
| 2013/0311931 A1 | 11/2013 | Kokubo | |
| 2015/0116362 A1 | 4/2015 | Aurongzeb et al. | |
| 2015/0326921 A1 | 11/2015 | Makovetsky et al. | |
| 2016/0011731 A1 | 1/2016 | Pasquero et al. | |

* cited by examiner

FIG. 7A

LAPTOP-TO-TABLET MODE ADAPTATION

CROSS-REFERENCE TO RELATED APPLICATION

The present application is a continuation of U.S. patent application Ser. No. 14/283,036, entitled "LAPTOP-TO-TABLET MODE ADAPTATION" and filed on May 20, 2014, which is hereby incorporated by reference in its entirety for all purposes.

BACKGROUND

Field

The disclosed system and method relate to automatic switching a user interface upon detection of a change in hardware configuration.

Description of Related Art

Personal computing devices available today have ever reducing form factors and increasing mobility. As device mobility increases due to the convergence of widespread broadband availability and enhanced computational capability, the ability of switching a user interface according to a specific configuration for a single device becomes an attractive feature for consumers. Currently, devices that operate in a hybrid desktop and tablet mode implement user interface adjustments between the two modes by requesting the user to select a specific user interface. This requires the user to perform an extra step when physically altering the configuration of a device from a desktop configuration to a tablet configuration, complicating the switching process and adding discomfort to the user experience. Also, current mobile computation devices often require the user to perform at least two physical actions to switch a display from a first active application to a second active application, adding a delay and discomfort to the application switching process.

SUMMARY

According to one embodiment of the present disclosure a computer-implemented method for automatically transitioning a user interface in a personal computing device between a laptop configuration and a tablet configuration is provided. The method includes detecting a hardware configuration change in the personal computing device. When the hardware configuration changes to a tablet configuration, the computer-implemented method includes maximizing an active window in a display of the personal computing device and maximizing a second, inactive window, underneath the active window. And when the hardware configuration changes to a laptop configuration, the computer-implemented method includes configuring the user interface to a windows icons menus and pointers (WIMP) mode.

According to one embodiment of the present disclosure, a personal computing device having a base portion coupled to a display portion is provided. The personal computing device includes a touch sensitive screen in the display portion, the touch sensitive screen configured to operate in a laptop mode and a tablet mode. The personal computing device includes a memory circuit and a processor circuit, wherein the memory circuit stores commands that when executed by the processor circuit cause a user interface in the personal computing device to operate the touch sensitive screen in one of a laptop mode and a tablet mode. The personal computing device also includes a coupling element to form a hardware configuration with the base portion and the display portion, and a sensor to determine a separation between the base portion and the display portion. In some embodiments the sensor is configured to send a signal to the processor circuit to switch the user interface from the laptop mode to the tablet mode when the separation is detected.

According to one embodiment, a non-transitory computer-readable medium storing commands is provided. The commands, when executed by a processor circuit in a personal computing device having a touch screen display, cause the personal computer device to perform a method including detecting a hardware configuration change in the personal computing device. The method also includes maximizing a plurality of opened windows in the touch screen display when the configuration changes to a first configuration, and stacking the plurality of opened windows in the display according to a temporal order. When the hardware configuration changes to a second configuration, the method includes spreading the plurality of windows across the screen display. In some embodiments, spreading the plurality of windows includes leaving an interactive portion of each of the plurality of windows available to a pointer in the touch screen display.

According to one embodiment, a personal computing device having a base portion coupled to a display portion is provided. The personal computing device includes a touch sensitive screen in the display portion, the touch sensitive screen is configured to operate in a laptop mode and a tablet mode. The personal computing device also includes a memory circuit and a processor circuit; wherein the memory circuit stores commands that when executed by the processor circuit cause a user interface in the personal computing device to operate the touch sensitive screen in one of a laptop mode and a tablet mode. The personal computing device includes a means to form a physical configuration with the base portion and the display portion, and a means to determine a separation between the base portion and the display portion. The means to determine a separation is configured to send a signal to the processor circuit to switch the user interface from the laptop mode to the tablet mode when the separation is detected.

BRIEF DESCRIPTION OF THE DRAWINGS

FIG. 7A illustrates an interactive display of a tablet mode step in a method for switching a user interface upon detection of a change in hardware configuration, according to some embodiments.

In the figures, elements with the same or similar reference numerals have the same or similar function or steps, unless otherwise indicated.

DETAILED DESCRIPTION

In the following detailed description, numerous specific details are set forth to provide a full understanding of the present disclosure. It will be apparent, however, to one ordinarily skilled in the art that the embodiments of the present disclosure can be practiced without some of these specific details. In other instances, well-known structures and techniques have not been shown in detail so as not to obscure the disclosure.

The present disclosure relates to methods and systems to automatically detect an operating configuration mode switch in a personal computing device to make a user interface transition transparent to a user. In some embodiments, the transition includes re-arranging a plurality of windows in laptop mode into a temporally stacked set of maximized windows in tablet mode. Accordingly, the user interface switch is triggered when, for example, an angle of a portion of a device operating in laptop mode is bent past a threshold angle value. In some embodiments, the user interface switching is triggered when a keyboard is physically separated from a touch-screen display in the device.

The present disclosure also relates to methods and systems to provide a permanent multi task affordance for tablets and other personal computing devices having a touch screen display. In that regard, some embodiments consistent with the present disclosure include a gestural interface for application switching that allows a user to switch from a first active application to a second active application using a single gesture.

Embodiments as disclosed herein relate to a multi-mode personal computing device that may adopt any of a plurality of hardware configurations such as a laptop, a tablet, a stand display, or a tent display, among others. Accordingly, the present disclosure provides a method and a system to automatically adjust a user interface in the multi-mode personal computing device for each of the different hardware configurations. The user interface in embodiments consistent with the present disclosure provides a display mode adjustment in a manner that is transparent to the user. Thus, the user may simply engage in physically adjusting the personal computing device as desired without having to activate a specific switch or provide a command for the user interface to provide the adjustment.

Figure 1:
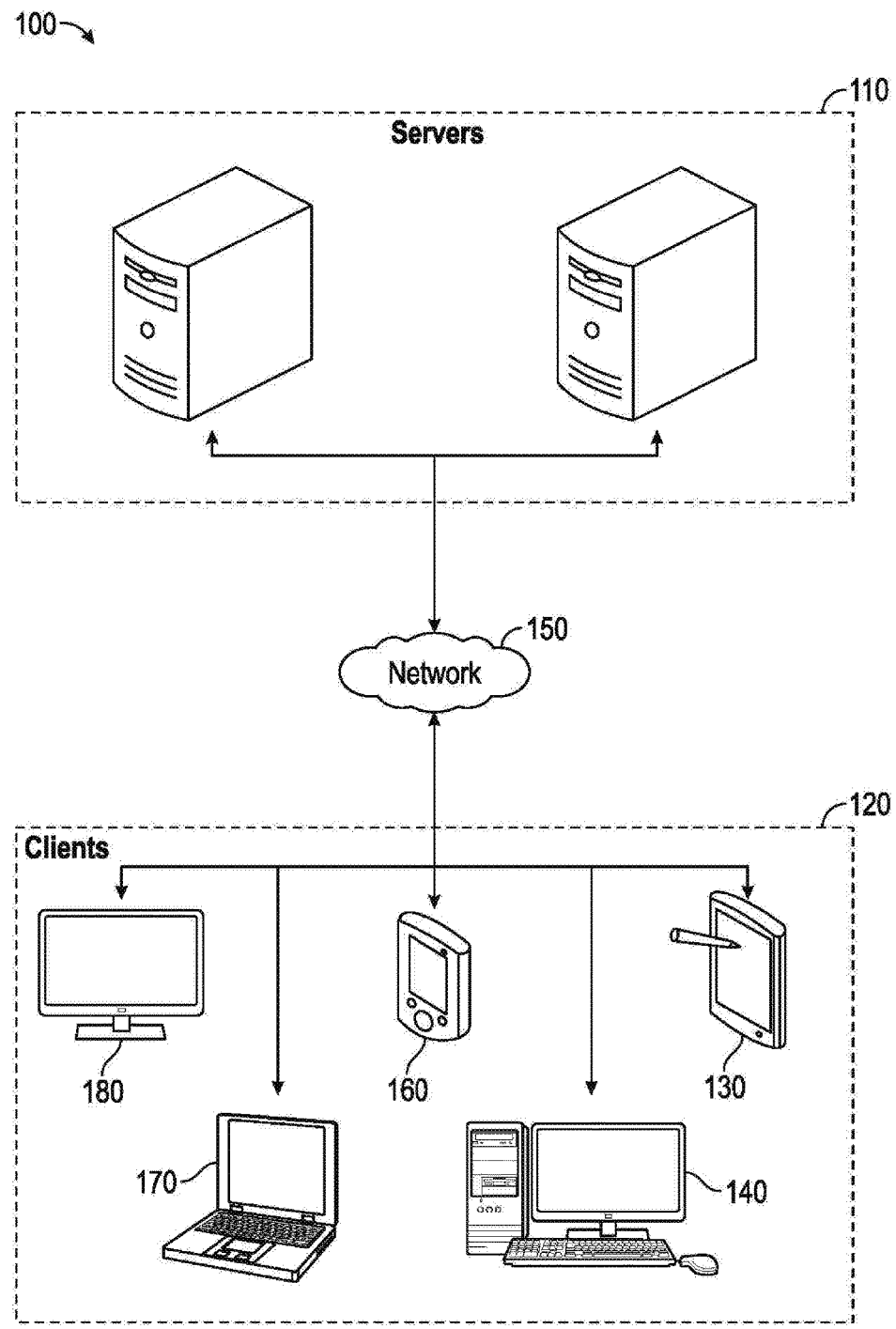
FIG. 1 illustrates an example architecture for switching a user interface upon detection of a change in hardware configuration, according to some embodiments.

FIG. 1 illustrates an example architecture 100 for switching a user interface upon detection of a change in hardware configuration. Architecture 100 includes servers 110 and personal computing devices 120 connected over a network 150. Each of the many personal computing devices 120 is configured to include and execute an application for displaying content. The application can be, for example, a web browser, a document or text editing program, an image editing program, a video editing program, a gaming program, or any other program that displays content. The content can be, for example, a web page, a document, an image, a video, an audio file, a game, or other displayable content. Personal computing devices 120 can be, for example, a tablet computer 130 (e.g., including e-book readers), a desktop computer 140, a mobile device 160 (e.g., a smartphone or PDA), a personal computer device 170, a set top box 180 (e.g., for a television), or any other devices having appropriate processor, memory, and communications capabilities for displaying content. More particularly, personal computing devices 120 may correspond to registered clients of one or more of servers 110.

In certain aspects, the content for display in the application can be obtained from one or many servers 110 over network 150. Servers 110 can be any device having an appropriate processor, memory, and communications capability for hosting the content for display. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
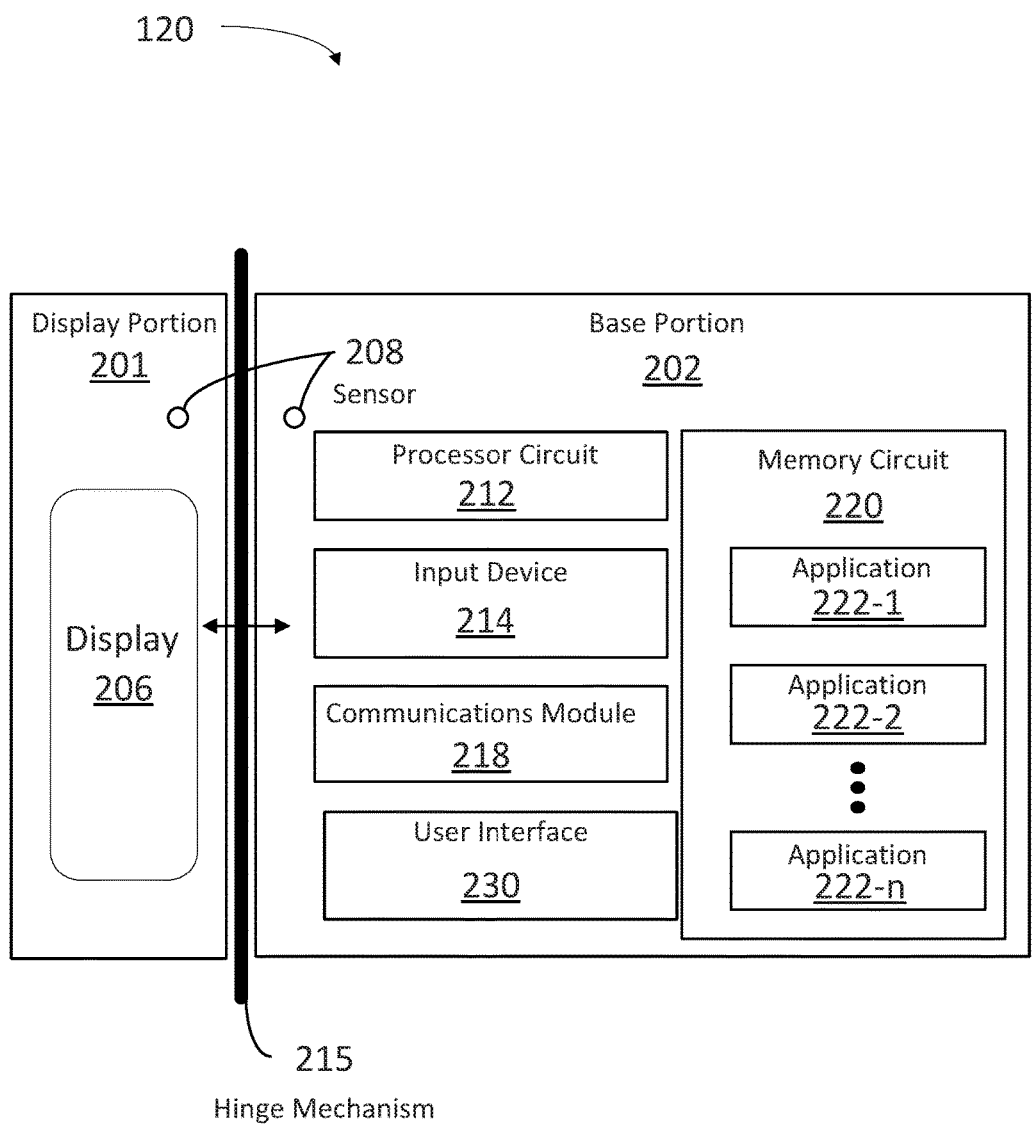
FIG. 2 illustrates a personal computing device including a switchable user interface, according to some embodiments.

FIG. 2 illustrates a personal computing device 120 including a switchable user interface 230, according to some embodiments. Personal computing device 120 includes a display portion 201 having a display 206. In some embodiments, display 206 is a touch sensitive display. Personal computing device 120 also includes a base portion 202 having a sensor 208, a processor circuit 212, an input device 214, a hinge mechanism 215, a communications module 218, a memory circuit 220, and user interface 230. Sensor 208 is configured to detect and determine a hardware configuration for device 120. In some embodiments sensor 208 may include a sensing element in display portion 201 and a sensing element in base portion 202. In some embodiments, sensor 208 includes a position sensor and a motion sensor, such as a gyroscope, to detect a relative motion between display portion 201 and base portion 202. Moreover, in some embodiments sensor 208 is coupled to memory circuit 220 to store position data and motion data collected over a period of time to facilitate an accurate determination of the hardware configuration.

Hinge mechanism 215 couples display portion 201 and base portion 202. In some embodiments display portion 201 and base portion 202 are adjustable relative to one another to provide multiple hardware configurations for personal computing device 120. Therefore, personal computing device 120 adapts for different purposes selected by the user. In some embodiments, hinge mechanism 215 is configured to allow the relative position between display portion 201 and base portion 202 to be rotationally changed about an axis defining hinge mechanism 215. Hinge mechanism 215 can take any of multiple forms, having one, two or more points of contact between display portion 201 and base portion 202. Moreover, in some embodiments hinge mechanism 215 is configured to allow the relative position between display portion 201 and base portion 202 to be rotationally changed about more than one axis. For example, in some embodiments hinge mechanism 215 allows display portion 201 and base portion 202 to be rotated about two axes perpendicular to each other. Further according to some embodiments, hinge mechanism 215 includes levers, arms and clips configured to physically separate, partially or completely, display portion 201 from base portion 202. Accordingly, sensor 208 detects the separation between display portion 201 and base portion 202 and is able to determine a specific hardware configuration for personal computing device 120.

Processor circuit 212 is configured to execute commands stored in memory circuit 220 so that personal computing device 120 performs steps in methods consistent with the present disclosure. Input device 214 is, for example, a keyboard. In some embodiments input device 214 includes a mouse or a pointer device. Accordingly, input device 214 is configured to operate in parallel with a touch screen in display 206. Communications module 218 is configured to couple device 120 with network 150 and access network server 110. Accordingly, communications module 218 can include wireless circuits and devices, such as Radio-Frequency (RF) antennas, transmitters, receivers, and transceivers. In some embodiments, communications module 218 includes an optical fiber cable, or a wire cable, configured to transmit and receive signals to and from network 150. Memory circuit 220 may include a first application 222-1, a second application 222-2, and any number of applications up to 222-n (hereinafter collectively referred to as 'applications 222') where 'n' is any integer. Applications 222 include data and commands which, when executed by processor circuit 212, cause device 120 to perform operations including transmitting and receiving data and commands to and from a server 110 through network 150. In that regard, each of applications 222 includes a window in display 206. And user interface 230 arranges the windows for applications 222 in display 206 to provide an interactive platform between a user and personal computer device 120. As the user has different aptitudes and desires according to a hardware configuration of personal computing device 120, user interface 230 is switchable according to the hardware configuration of device 120.

Figure 3:
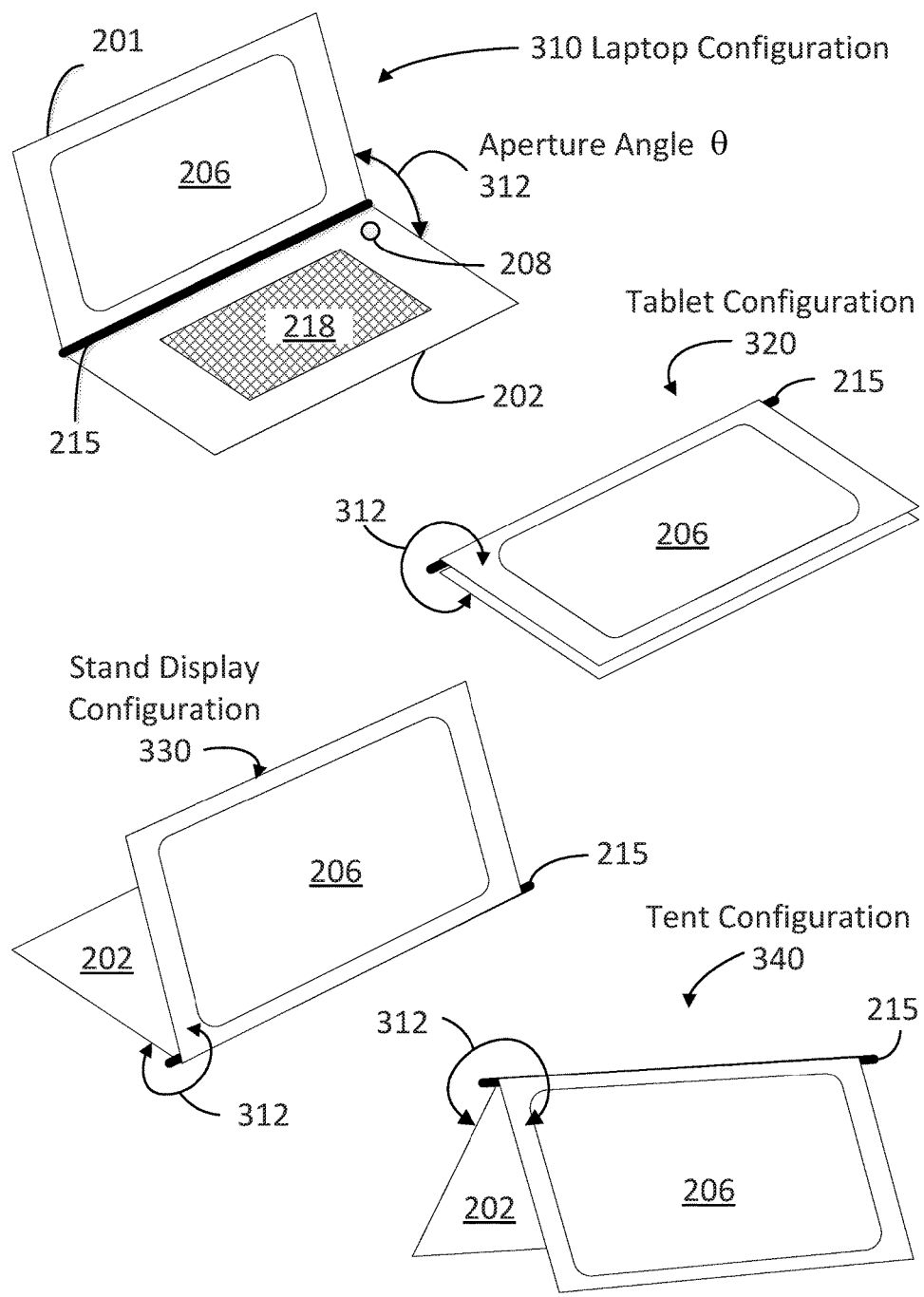
FIG. 3 illustrates a plurality of hardware configurations of a personal computing device, according to some embodiments.

FIG. 3 illustrates a plurality of hardware configurations of a personal computing device 120, according to some embodiments. Accordingly, in some embodiments personal computing device 120 adopts any one of a laptop configuration 310, a tablet configuration 320, a stand display configuration 330, and a tent configuration 340. Any one of configurations 310, 320, 330, and 340 is detected by sensor 208. In some embodiments, sensor 208 is configured to measure an aperture angle 312 ('θ') formed between display portion 201 and base portion 202 about hinge mechanism 215. Accordingly, when aperture angle 312 is less than about 180°, the hardware configuration may be determined as laptop configuration 310. When aperture angle 312 is approximately 360°, the hardware configuration may be determined as tablet configuration 320. When aperture angle 312 is more than about 180° and less than about 360°, and personal computing device 120 rests flat on base portion 202, the hardware configuration may be determined as stand display configuration 330. When aperture angle 312 is more than about 180° and less than about 360°, and personal computing device 120 rests on an edge of display portion 201 and an edge of base portion 202, the hardware configuration may be determined as tent configuration 340.

Figure 4:
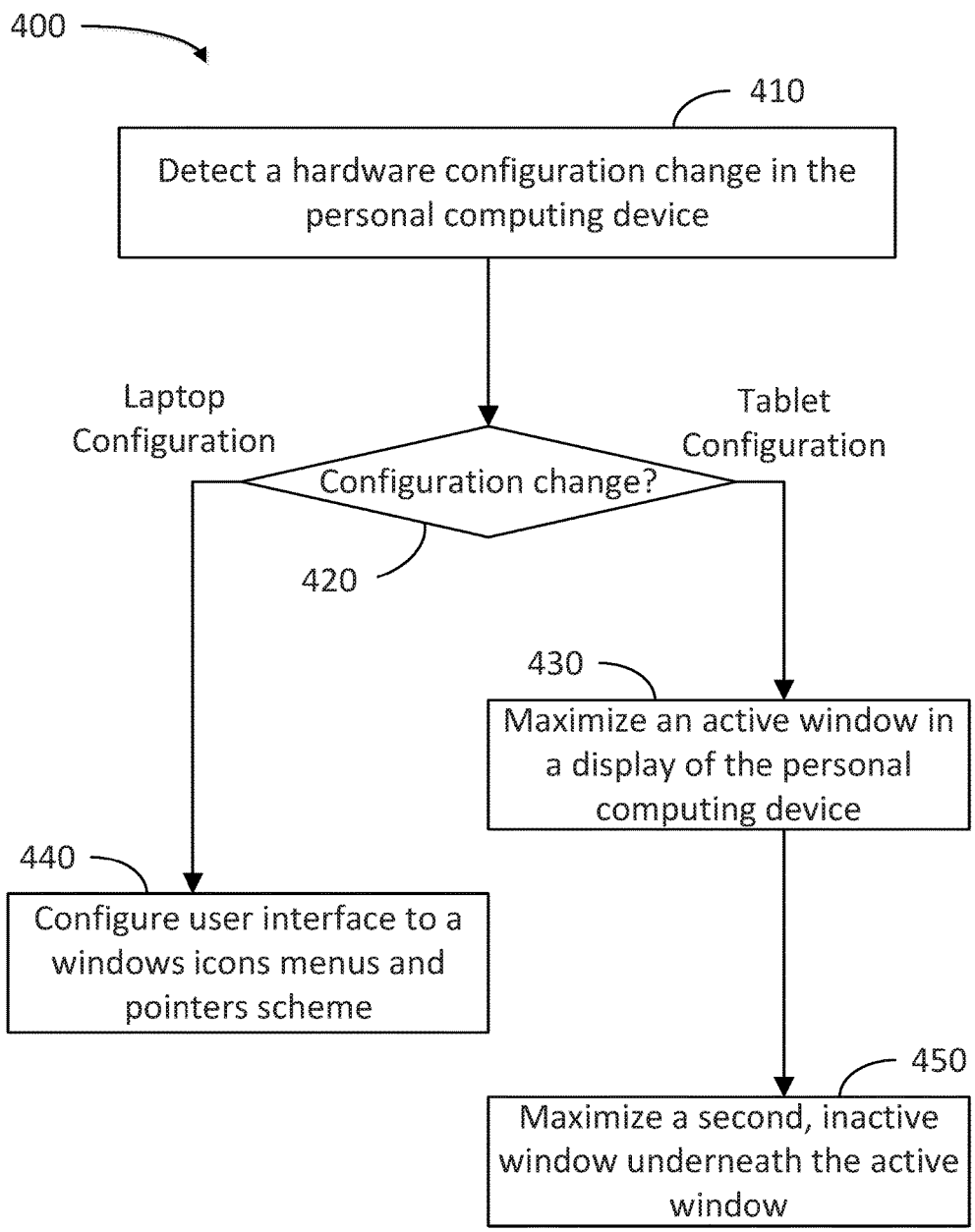
FIG. 4 illustrates a flow chart in a method for switching a user interface upon detection of a change in hardware configuration, according to some embodiments.

FIG. 4 illustrates a flow chart in a method 400 for switching a user interface upon detection of a change in hardware configuration, according to some embodiments. Steps in method 400 can be performed by a processor circuit in a computer, the processor circuit executing commands stored in a memory circuit of the computer. The computer in method 400 is a personal computing device adjustable into multiple hardware configurations (e.g., personal computer device 120 and hardware configurations 310, 320, 330, and 340). Accordingly, steps in method 400 can be partially or completely performed by processor circuit 212 in personal computing device 120, executing commands stored in memory circuit 220. In some embodiments of method 400, the memory circuit includes user interface software (e.g., user interface 230) to control a touch sensitive display (e.g., display 206). A change in hardware configuration in method 400 is detected by a sensor (e.g., sensor 208), according to some embodiments. The user interface in method 400 places a plurality of windows on the display, where each window is associated with an application installed in the memory circuit of the personal computing device (e.g., applications 222). Embodiments consistent with method 400 include at least one of the steps illustrated in FIG. 4, performed in any order. Furthermore, in some embodiments consistent with method 400, steps illustrated in FIG. 4 are performed simultaneously in time, or approximately simultaneously in time. Accordingly, in some embodiments consistent with method 400, steps in FIG. 4 are performed at least partially overlapping in time. Moreover, in some embodiments consistent with method 400, other steps can be included in addition to at least one of the steps illustrated in FIG. 4.

Step 410 includes detecting a change in hardware configuration in the personal computing device. Step 420 includes determining whether the configuration change corresponds to a user interface in tablet configuration or in laptop configuration. When the user interface is in tablet configuration according to step 420: step 430 includes maximizing an active window in a display of the personal computing device; and step 450 includes maximizing a second, inactive window underneath the active window in the display. When the user interface is in laptop configuration, step 440 includes configuring the user interface to a windows icons menus and pointers (WIMP) scheme.

Figure 5:
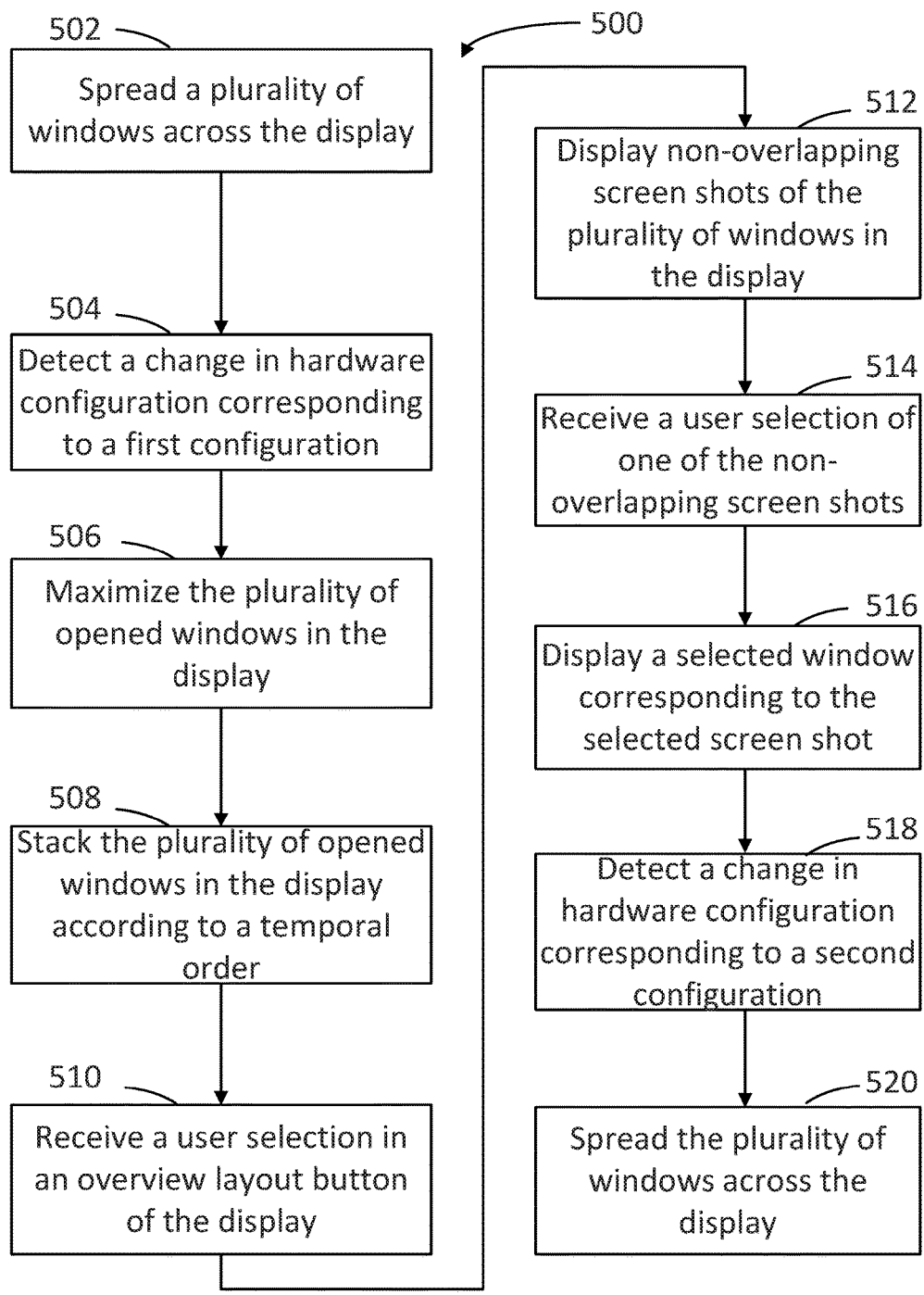
FIG. 5 illustrates a flow chart in a method for switching a user interface upon detection of a change in hardware configuration, the user interface including browser windows and an active application, according to some embodiments.

FIG. 5 illustrates a flow chart in a method 500 for switching a user interface upon detection of a change in hardware configuration, the user interface including browser windows and an active application, according to some embodiments. Steps in method 500 can be performed by a processor circuit in a computer, the processor circuit executing commands stored in a memory circuit of the computer. The computer in method 500 is a personal computing device adjustable into multiple hardware configurations (e.g., personal computer device 120 and hardware configurations 310, 320, 330, and 340). Accordingly, steps in method 500 can be partially or completely performed by processor circuit 212 in personal computing device 120, executing commands stored in memory circuit 220. In some embodiments of method 500, the memory circuit includes user interface software (e.g., user interface 230) to control a touch sensitive display (e.g., display 206). A change in hardware configuration in method 500 is detected by a sensor (e.g., sensor 208), according to some embodiments. The user interface in method 500 places a plurality of windows on the display, where each window is associated to an application installed in the memory circuit of the personal computing device (e.g., applications 222). Embodiments consistent with method 500 include at least one of the steps illustrated in FIG. 5, performed in any order. Furthermore, in some embodiments consistent with method 500, steps illustrated in FIG. 5 are performed simultaneously in time, or approximately simultaneously in time. Accordingly, in some embodiments consistent with method 500, steps in FIG. 5 are performed at least partially overlapping in time. Moreover, in some embodiments consistent with method 500, other steps can be included in addition to at least one of the steps illustrated in FIG. 5.

Step 502 includes spreading a plurality of windows across the display. In some embodiments step 502 includes placing the most recently active window at the forefront. Furthermore, in some embodiments the plurality of windows may partially overlap, such that at least a portion of each widow is accessible to the user via a pointer device.

Step 504 includes detecting a change in hardware configuration corresponding to a first configuration. In some embodiments, the first configuration is any one of tablet configuration 320, stand display configuration 330, or tent configuration 340. Accordingly, step 504 includes collecting and processing data from the sensor. For example, in some embodiments step 504 includes measuring an angle formed between a display portion and a base portion of the computer. In some embodiments step 504 includes detecting a separation between the base portion and the display portion of the computer. Step 506 includes maximizing the plurality of opened windows in the display. Accordingly, step 506 provides a smooth transition between a laptop mode and a tablet mode by the user interface. For example, step 506 includes detecting a form factor of a window in the laptop mode, and preserving the same form factor as the window is maximized in the first configuration.

Step 508 includes stacking the plurality of opened windows in the display according to a temporal order. In some embodiments step 508 includes filling the display with the most recently active window. In some embodiments, step 508 includes adding new user-interface elements to a maximized window in the tablet configuration. For example, some newly added elements when the user interface is in tablet mode include an overview layout control for displaying small icons of all the windows so the user may select the window to be maximized. Accordingly, step 508 may include placing the overview layout control in a corner of a permanent affordance bar.

Step 510 includes receiving a user selection in the overview layout control of the display. Step 512 includes displaying non-overlapping screen shots of the plurality of windows in the display. In some embodiments, step 512 includes highlighting a screen shot of a window currently in use, in the set of non-overlapping screen shots. Further according to some embodiments, step 512 includes displaying the non-overlapping screen shots in a grid pattern, such as a square grid pattern. Step 514 includes receiving a user selection of one of the non-overlapping screen shots. In some embodiments step 514 includes receiving a finger gesture on the screen, such as a tap on a selected window, or a swipe in the direction from the highlighted screen shot to the selected screen shot. Step 516 includes displaying a selected window corresponding to the selected screen shot. In some embodiments step 516 includes filling the display with the selected window.

Step 518 includes detecting a change in hardware configuration corresponding to a second configuration. In some embodiments, the second configuration is laptop configuration 310. Step 520 includes spreading the plurality of windows across the screen display. In some embodiments, step 520 may include placing the selected window at the forefront of the spread of the plurality of windows.

Figure 6:
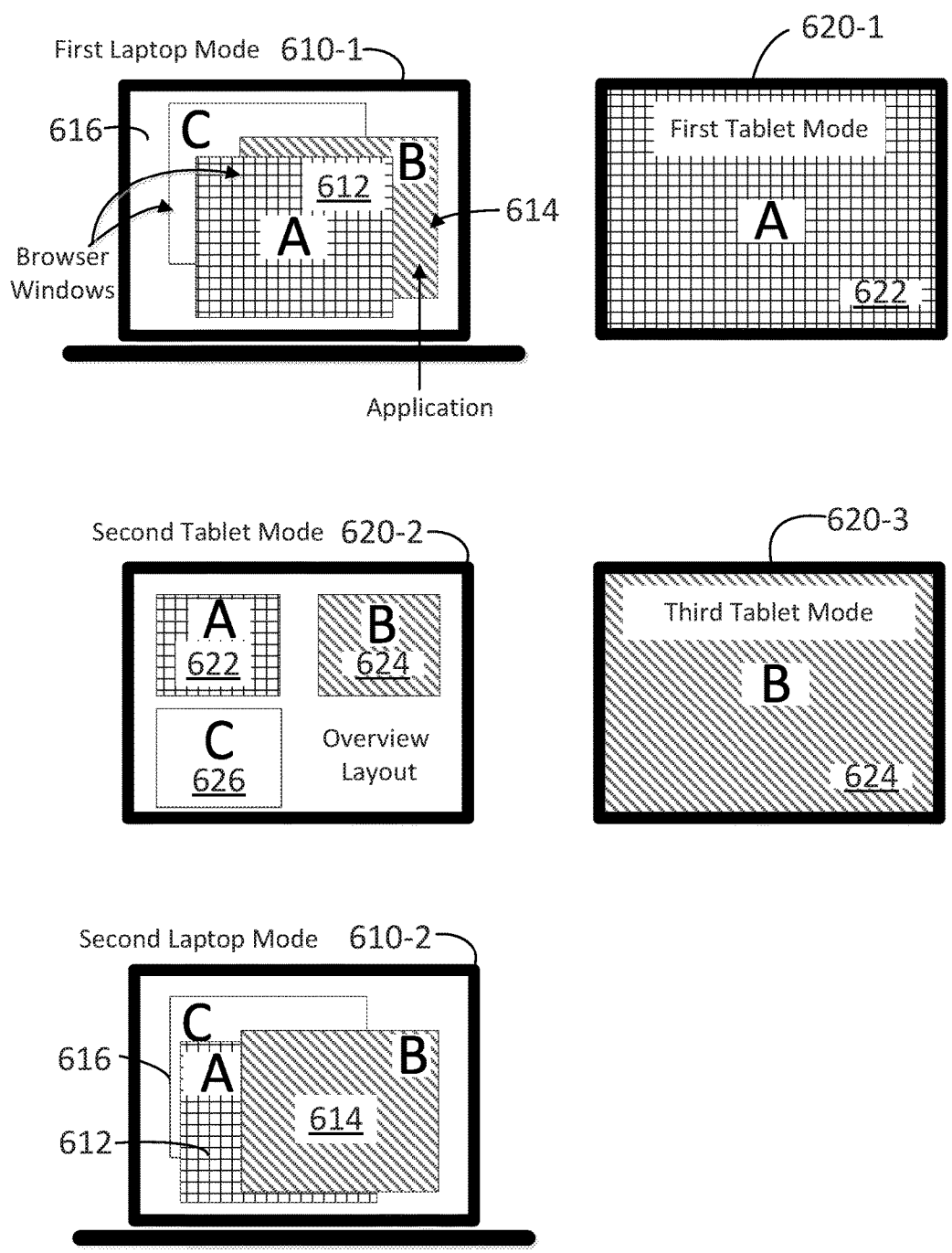
FIG. 6 illustrates diagrams representing steps in a method for switching a user interface upon detection of a change in hardware configuration, according to some embodiments.

FIG. 6 illustrates diagrams representing steps in a method for switching a user interface upon detection of a change in hardware configuration, according to some embodiments. Accordingly, diagrams in FIG. 6 correspond to steps in method 500, above. FIG. 6 illustrates a user interface switching between laptop modes 610-1 and 610-2 (hereinafter collectively referred to as 'laptop modes 610'), and tablet modes 620-1, 620-2, and 620-3 (hereinafter collectively referred to as 'tablet modes 620'). In laptop mode 610-1 display 206 includes browser windows 612 (A) and 616 (C), and an application window 614. In tablet mode 620-1, browser window 622 may fill display 206. In tablet mode 620-2, an overview layout may display a minimized view of browser windows 622 and 626, and application window 624. In some embodiments, tablet mode 620-2 displays windows 622, 624, and 626 in a non-overlapping manner. For example, as shown in FIG. 6, windows 622, 624, and 626 are displayed in a grid pattern. Moreover, in some embodiments user interface 230 is configured to allow the user to select either one of windows 622, 624, and 626 using a gesture over the touch screen. Further according to some embodiments, tablet mode 620-2 displays windows 622, 624 and 626 in a card stack format where the front window is the most recently used window, and the back window is the least recently used window. Accordingly, some embodiments implement a most-recently-used (MRU) stack configuration in tablet mode 620-2. In a tablet mode 620-3, application window 624 may be displayed at the forefront, filling the entire display, according to a gesture provided by the user in tablet mode 620-2. When user interface 230 switches back to laptop mode 610-2, windows 612, 614, and 615 are spatially spread over the display, with application window 614 at the forefront position, from tablet mode 620-3. In some embodiments laptop mode 610-2 preserves the sizes of windows 612, 614, and 616 from laptop mode 610-1, although not necessarily the order of windows 612, 614, and 616.

When user interface 230 sets in a tablet mode 620, windows 612, 614, and 616 in laptop mode 610 are maximized, either at the fore-front of display 206, or underneath the window displayed at the fore-front. Also, to ease user interaction with the touch screen, user interface 230 increases the size of interactive targets including buttons, controls, menus, and other interactive items appearing on display 206. For example, tabs in browser window 612 and 616 may be increased to better fit a finger size, or a pointer size. In any of tablet modes 620, user interface 230 restricts a user ability to change size of windows 622, 624, and 626, because the windows are maximized. For example, in some embodiments of tablet modes 620 the user may be able to toggle a maximized window into a minimized window, with no ability to re-size a window so that multiple windows may be laid on display 206. Accordingly, to switch between window 622 and window 626, a user may bring tablet mode 620-2 to use a gestural interface to make the switch, as described above. To get into tablet mode 620-2 from tablet mode 620-1 and to tablet mode 620-3 from tablet mode 620-2, the user may tap on an overview layout control button, as will be discussed in detail with respect to FIGS. 7A-7C, below. Additionally, user interface features such as a virtual keyboard and zoom factors for enhancing size of certain screen element are dynamically triggered based on whether the device is in either one of tablet modes 620 or laptop modes 610.

Figure 7A:
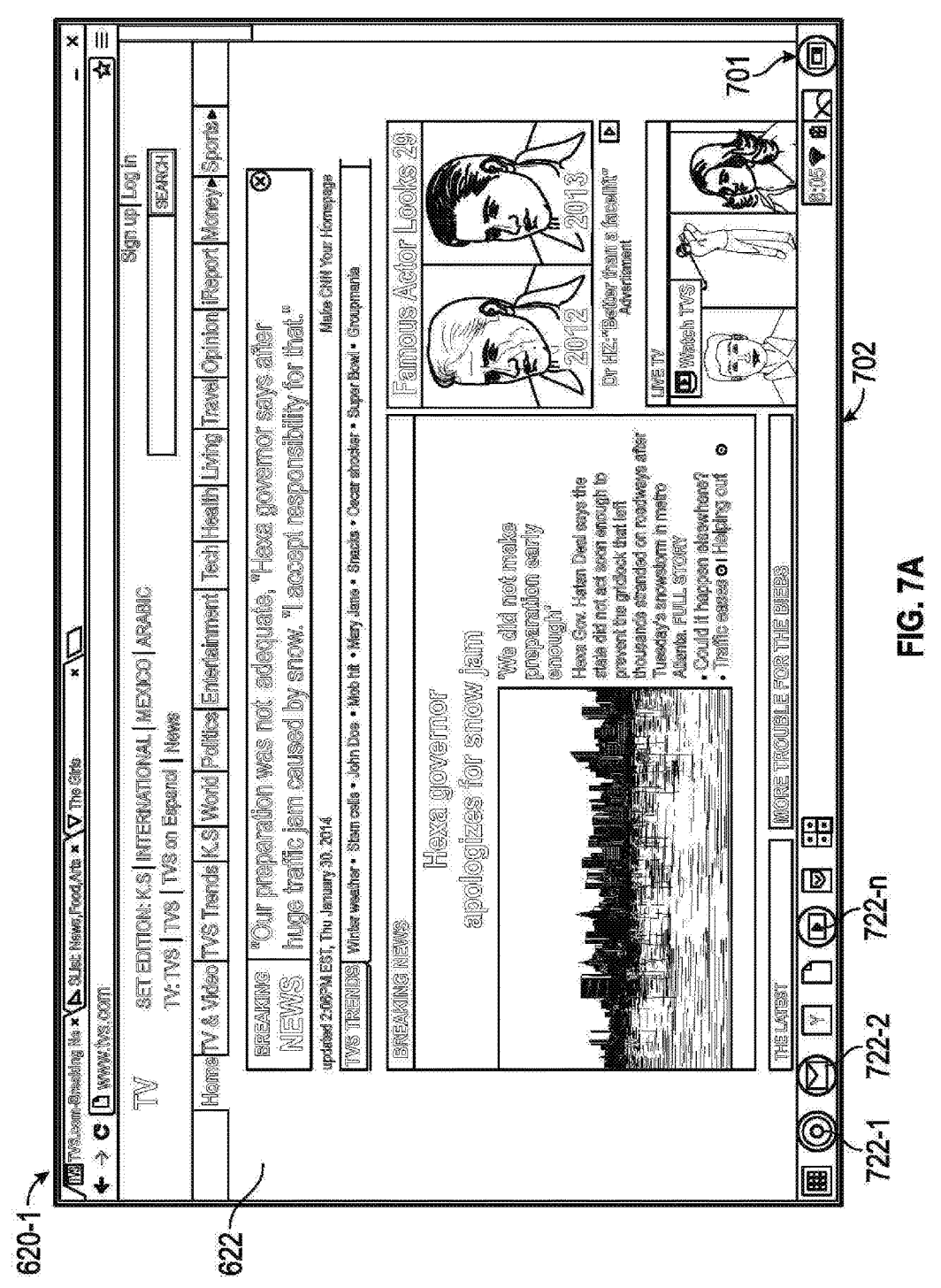

FIG. 7A illustrates an interactive display of tablet mode 620-1 selecting browser window 622 in a method for switching a user interface upon detection of a change in hardware configuration, according to some embodiments. Accordingly, FIG. 7A may be provided by user interface 230 in step 506 of method 500, described in detail above.

Overview layout control 701 is displayed on a permanent affordance bar 702. Permanent affordance bar 702 remains in display 206 throughout any of tablet modes 620. Permanent affordance bar 702 may include a plurality of icons 722-1, 722-2, through 722-*n* (hereinafter collectively referred to as icons 722), each icon corresponding to one of the plurality of applications 222 installed in memory circuit 220 of personal computing device 120. Accordingly, permanent affordance bar 702 enables the user to switch between active applications with a single gesture. For example, a user having a first application 222-1 running may simply tap on icon 722-2 on permanent affordance 701. When the user taps on icon 722-2, user interface 230 maximizes a window corresponding to application 222-2 on display 206. Accordingly, user interface 230 places application 222-1 in the background, still active.

Figure 7B:
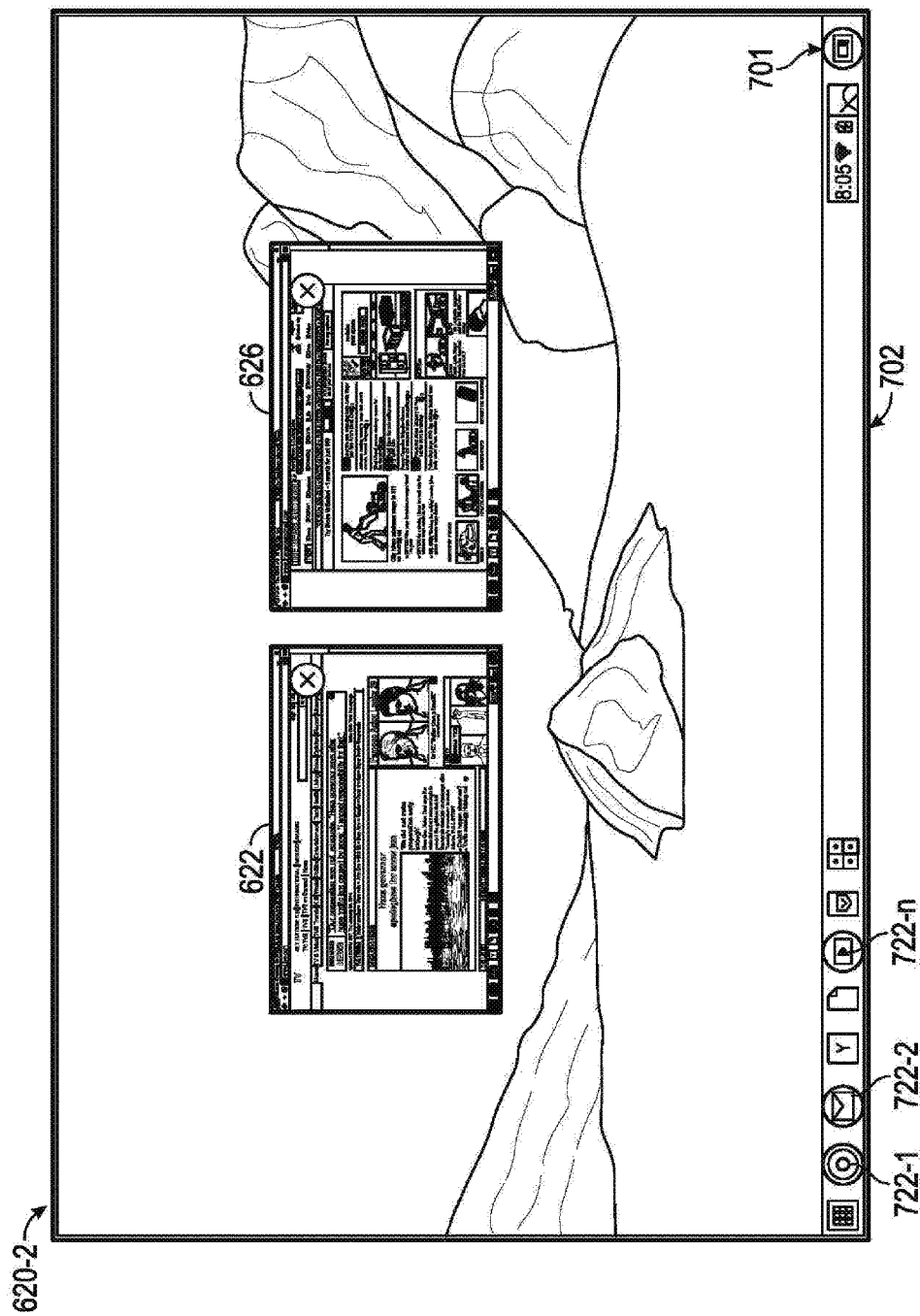
FIG. 7B illustrates an interactive display of a tablet mode step selecting a first window in a method for switching a user interface upon detection of a change in hardware configuration, according to some embodiments.

FIG. 7B illustrates an interactive display of a tablet mode 620-2 in a method for switching a user interface upon detection of a change in hardware configuration, according to some embodiments. Tablet mode 620-2 is displayed upon selection of overview layout control 701. Accordingly, in tablet mode 620-2 user interface 230 places browser window 622 and application window 624 on display 206. Accordingly, FIG. 7B may be provided by user interface 230 in step 512 of method 500, described in detail above.

Figure 7C:
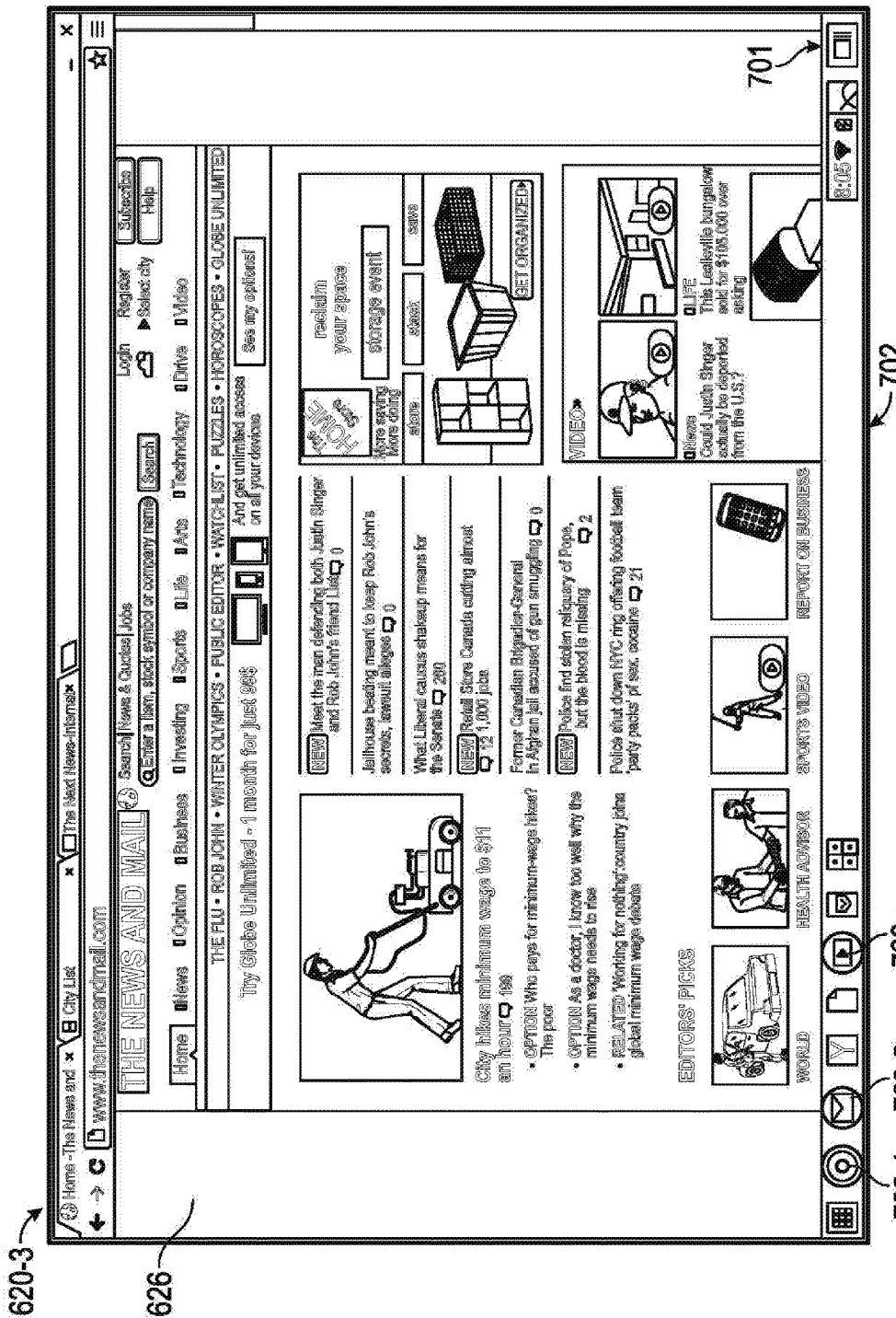
FIG. 7C illustrates an interactive display of a tablet mode step selecting a second window in a method for switching a user interface upon detection of a change in hardware configuration, according to some embodiments.

FIG. 7C illustrates an interactive display of tablet mode 620-3 selecting application window 624 in a method for switching a user interface upon detection of a change in hardware configuration, according to some embodiments. Accordingly, FIG. 7B may be provided by user interface 230 in step 516 of method 500, described in detail above.

Figure 8:
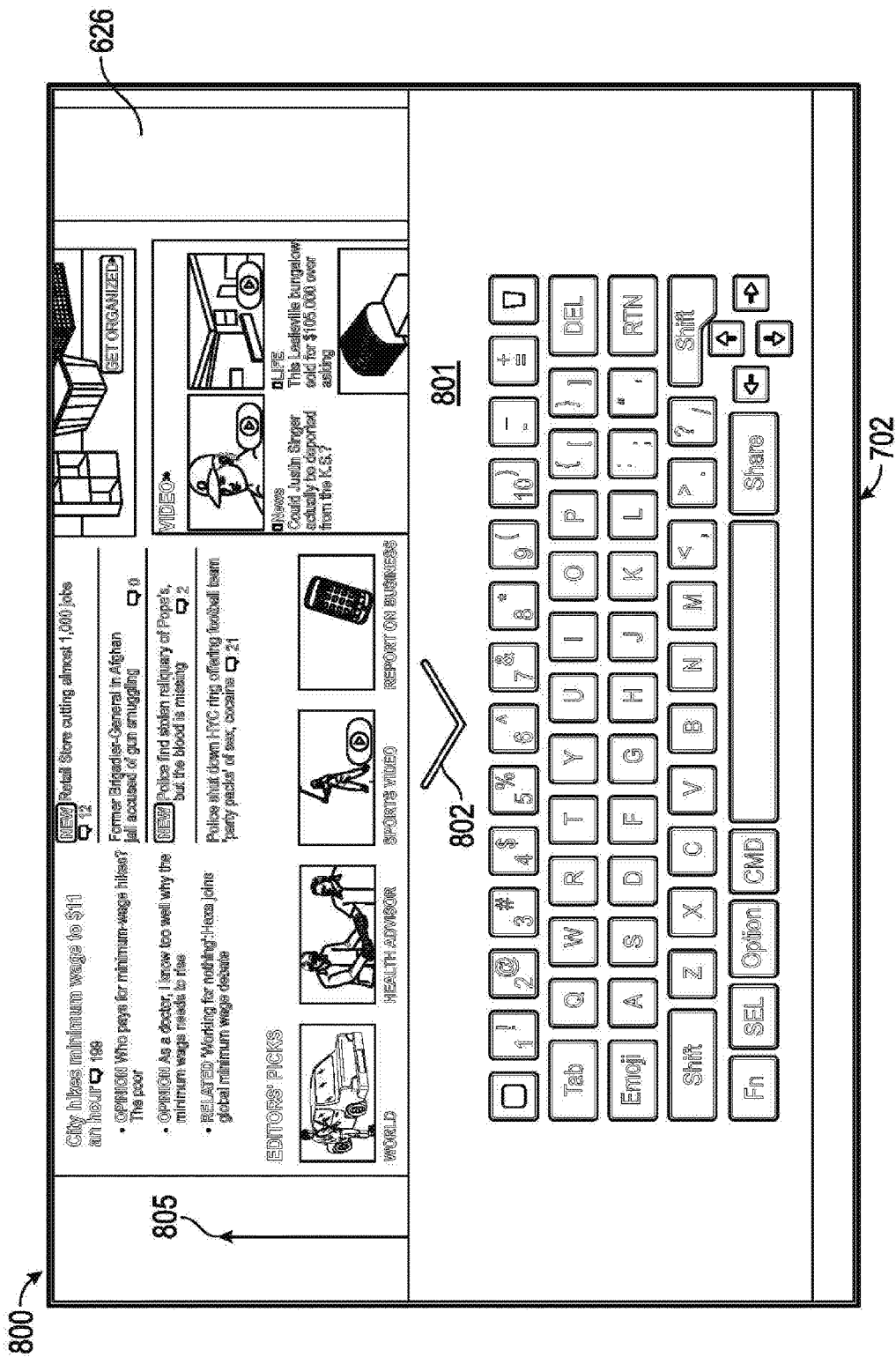
FIG. 8 illustrates a virtual keyboard pop-up feature in a tablet mode, according to some embodiments.

FIG. 8 illustrates a virtual keyboard pop-up feature 800 in a tablet mode 620-3, according to some embodiments. When virtual keyboard 801 pops-up in display 206, user interface 230 scrolls window 626 in a direction 805 to make space for virtual keyboard 801. Accordingly, when a window is maximized, such as window 626 in tablet mode 620-3, the transition illustrated in feature 800 causes little to no disturbance for the user, and is simpler to perform for user interface 230. For example, a transition such as feature 800 avoids a rearrangement of active windows in display 206. And feature 800 also avoids re-sizing of window 626 when virtual keyboard 801 pops-up on display 206, thus providing a smooth experience to the user. A pop-down tab 802 is also provided in feature 800, so that the user can revert back to a full window display when virtual keyboard 801 is no longer desired.

Figure 9:
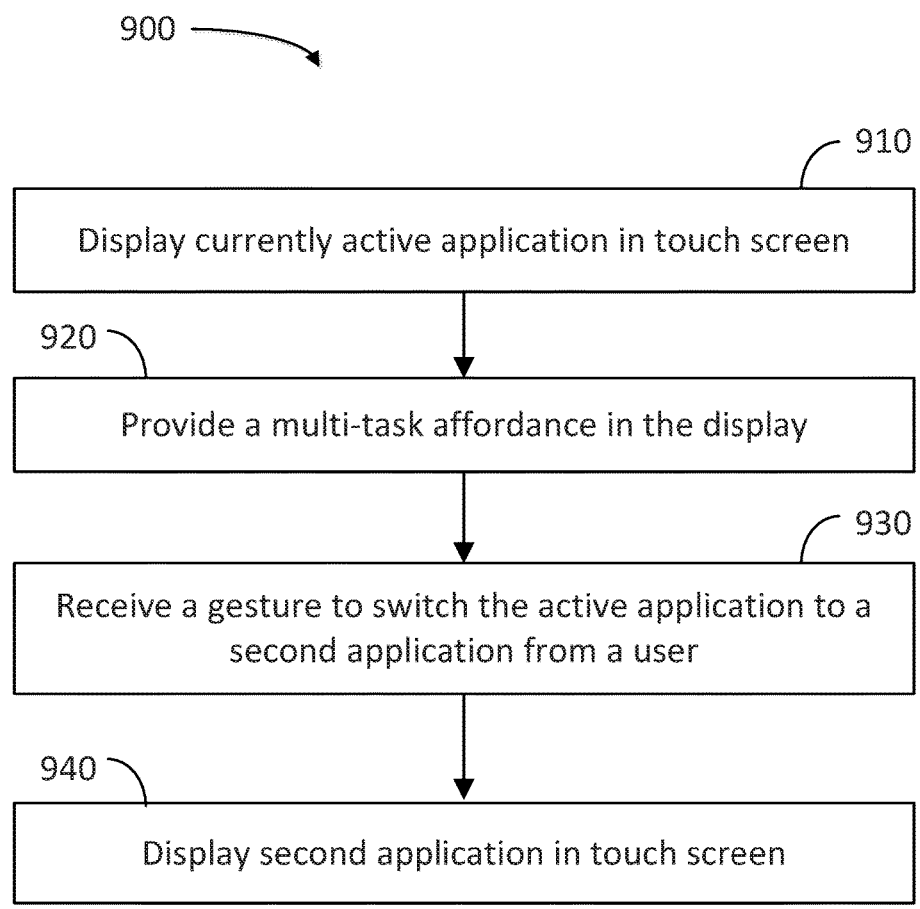
FIG. 9 illustrates a flow chart in a method for switching between active applications with a permanent multi-task affordance, according to some embodiments.

FIG. 9 illustrates a flow chart in a method 900 for switching between active applications with a permanent multi-task affordance, according to some embodiments. Steps in method 900 can be performed by a processor circuit in a computer, the processor circuit executing commands stored in a memory circuit of the computer. Accordingly, steps in method 900 can be partially or completely performed by processor circuit 212 in personal computing device 120, executing commands stored in memory circuit 220. In some embodiments of method 900, the memory circuit includes user interface software (e.g., user interface 230) to control a touch sensitive display (e.g., display 206). The user interface provides a permanent affordance bar including a plurality of icons, each icon corresponding to one of the plurality of applications installed in the memory circuit. The user interface in method 900 handles a plurality of windows on the display, where each window is associated to an application installed in the memory circuit of the personal computing device (e.g., applications 222). Embodiments consistent with method 900 include at least one of the steps illustrated in FIG. 10, performed in any order. Furthermore, in some embodiments consistent with method 900, steps illustrated in FIG. 9 are performed simultaneously in time, or approximately simultaneously in time. Accordingly, in some embodiments consistent with method 900, steps in FIG. 9 are performed at least partially overlapping in time. Moreover, in some embodiments consistent with method 900, other steps can be included in addition to at least one of the steps illustrated in FIG. 9.

Step 910 includes displaying a currently active application in touch screen mode. Accordingly, step 910 includes maximizing the window for the currently active application. Step 920 includes providing a multi-task affordance in the display. In some embodiments, step 920 includes permanently positioning the multi-task affordance in an area of the display, such as described in detail above with regard to permanent multi-task affordance 702. Step 920 includes displaying a plurality of icons in the permanent multi-task affordance, each icon corresponding to one of the plurality of applications installed in the memory circuit (e.g., icons 722). In that regard, step 920 includes forming the permanent multi-task affordance as a bar adjacent to one of the edges of the display. In yet other embodiments the permanent multi-task affordance may be an area on display 206, not necessarily in the shape of a rectangle, a square, or a stripe (as illustrated in FIG. 7), but in any other shape. In some embodiments, step 920 includes providing a gestural interface in the multi-task affordance. Accordingly, step 930 includes receiving a gesture from a user to switch the active application to a second application. Step 930 may include receiving a tap from the user on the icon corresponding to the second application. In some embodiments step 930 includes receiving a swipe from the user over the permanent multi-task affordance provided. In some embodiments, step 930 includes receiving a single gesture from the user to perform an application switching. Step 940 includes displaying the second application in the touch screen. Accordingly, step 940 includes maximizing a window for the second application in the display.

In embodiments consistent with the present disclosure, the application switching in method 900 occurs between a currently active application and a second, inactive application selected from any one of the plurality of applications installed in the personal computing device. In that regard, the second application may be an application used immediately before the currently active application, or another application recently inactive.

Figure 10:
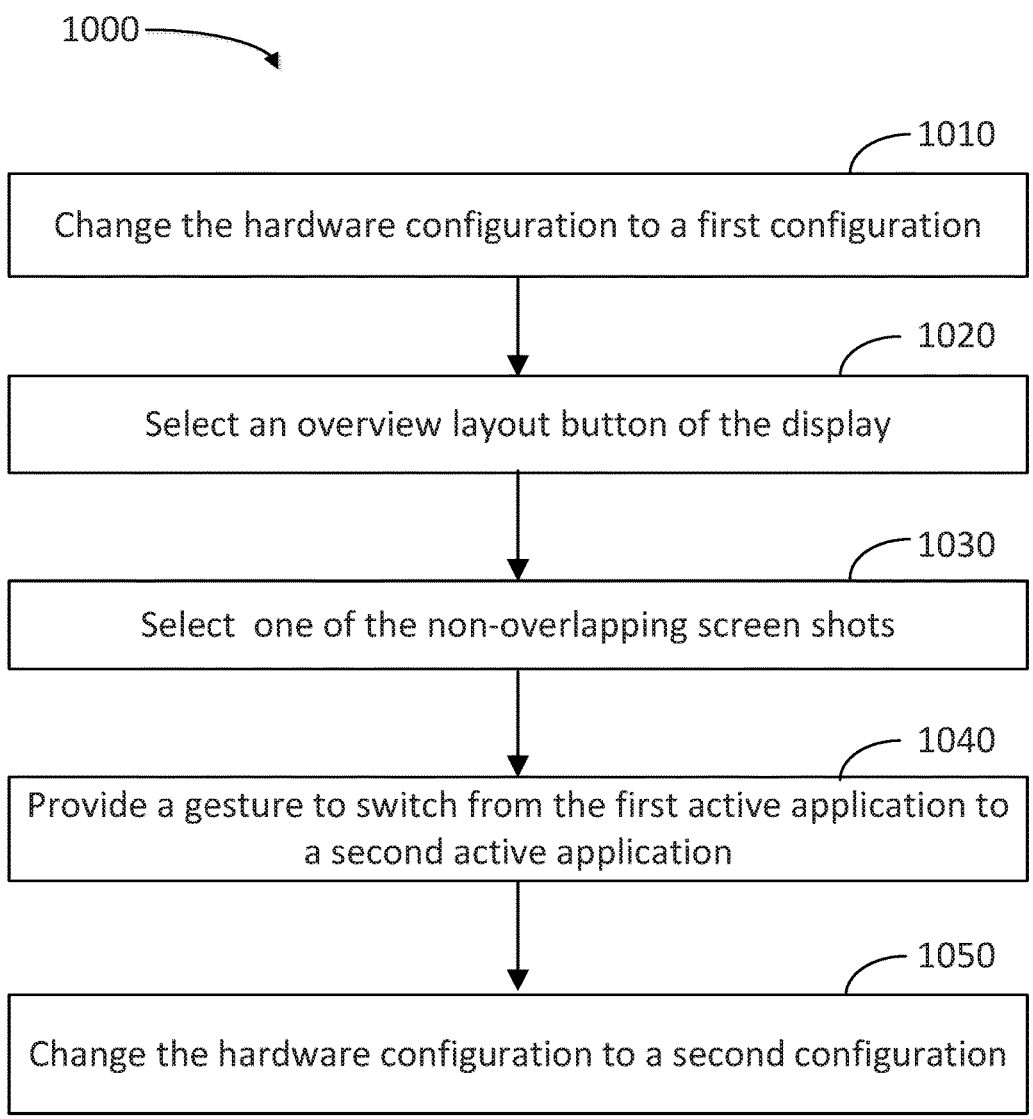
FIG. 10 illustrates a flow chart in a method for changing the hardware configuration in a personal computing device and switching between at least two active applications, according to some embodiments.

FIG. 10 illustrates a flow chart in a method 1000 for changing the hardware configuration in a personal computing device and switching between at least two active applications, according to some embodiments. Steps in method 1000 can be performed by a user of a personal computing device adjustable into multiple hardware configurations (e.g., personal computer device 120 and hardware configurations 310, 320, 330, and 340). In some embodiments, steps in method 1000 can be partially or completely performed by processor circuit 212 in personal computing device 120, executing commands stored in memory circuit 220. In some embodiments of method 1000, the memory circuit includes user interface software (e.g., user interface 230) to control a touch sensitive display (e.g., display 206). A change in hardware configuration in method 1000 is detected by a sensor (e.g., sensor 208), according to some embodiments. The user interface in method 1000 places a plurality of windows on the display, where each window is associated to an application installed in the memory circuit of the personal computing device (e.g., applications 222). Embodiments consistent with method 1000 include at least one of the steps illustrated in FIG. 10, performed in any order. Furthermore, in some embodiments consistent with method 1000, steps illustrated in FIG. 10 are performed simultaneously in time, or approximately simultaneously in time. Accordingly, in some embodiments consistent with method 1000, steps in FIG. 10 are performed at least partially overlapping in time. Moreover, in some embodiments consistent with method 1000, other steps can be included in addition to at least one of the steps illustrated in FIG. 10.

Step 1010 includes changing the hardware configuration to a first configuration (e.g., tablet configuration 320). In some embodiments, the first configuration is any one of tablet configuration 320, stand display configuration 330, and tent configuration 340. For example, the user rotates the display portion relative to the base portion of the personal computing device to a desired aperture angle (e.g., display portion 201, base portion 202, and aperture angle 312). In some embodiments, step 1010 includes changing the hardware configuration to a stand display configuration (e.g., stand display configuration 330). Furthermore, in some embodiments step 1010 includes changing the hardware configuration to a tent configuration (e.g., tent configuration 340). Accordingly, the user interface in the personal computer device selects a tablet mode for user interface for either one of the tablet configuration, the stand display configuration and the tent configuration. In some embodiments, the user may physically separate the display portion from the base portion of the personal computing device in step 1010. Further according to some embodiments, the user may flip one of the display portion or the base portion of the personal computing device in step 1010.

Step 1020 includes selecting an overview layout button of the display. In step 1020, the user may tap an overview layout control on a permanent multi-task affordance bar on the display (e.g., permanent multi-task affordance 702). When the overview layout button is selected in step 1020, the user interface displays a plurality of non-overlapping screen shots on the display. Each of the non-overlapping screen shots corresponds to an active browser window or an active application window (e.g., windows 622, 624, and 626). Step 1030 includes selecting one of the non-overlapping screen shots to maximize the corresponding window in the display. For example, in some embodiments the selected window corresponds to a first active application in the personal computing device.

Step 1040 includes providing a gesture to switch from the first active application to a second active application. The gesture includes two icons placed by the user interface in the permanent multi-task affordance bar on the display. Accordingly, the user provides a single gesture to switch from the first active application to the second active application. And step 1050 includes changing the hardware configuration to a second configuration. Accordingly, in some embodiments the user rejoins the display portion and the base portion of the personal computing device in step 1040, to obtain a laptop configuration (e.g., laptop configuration 310).

Figure 11:
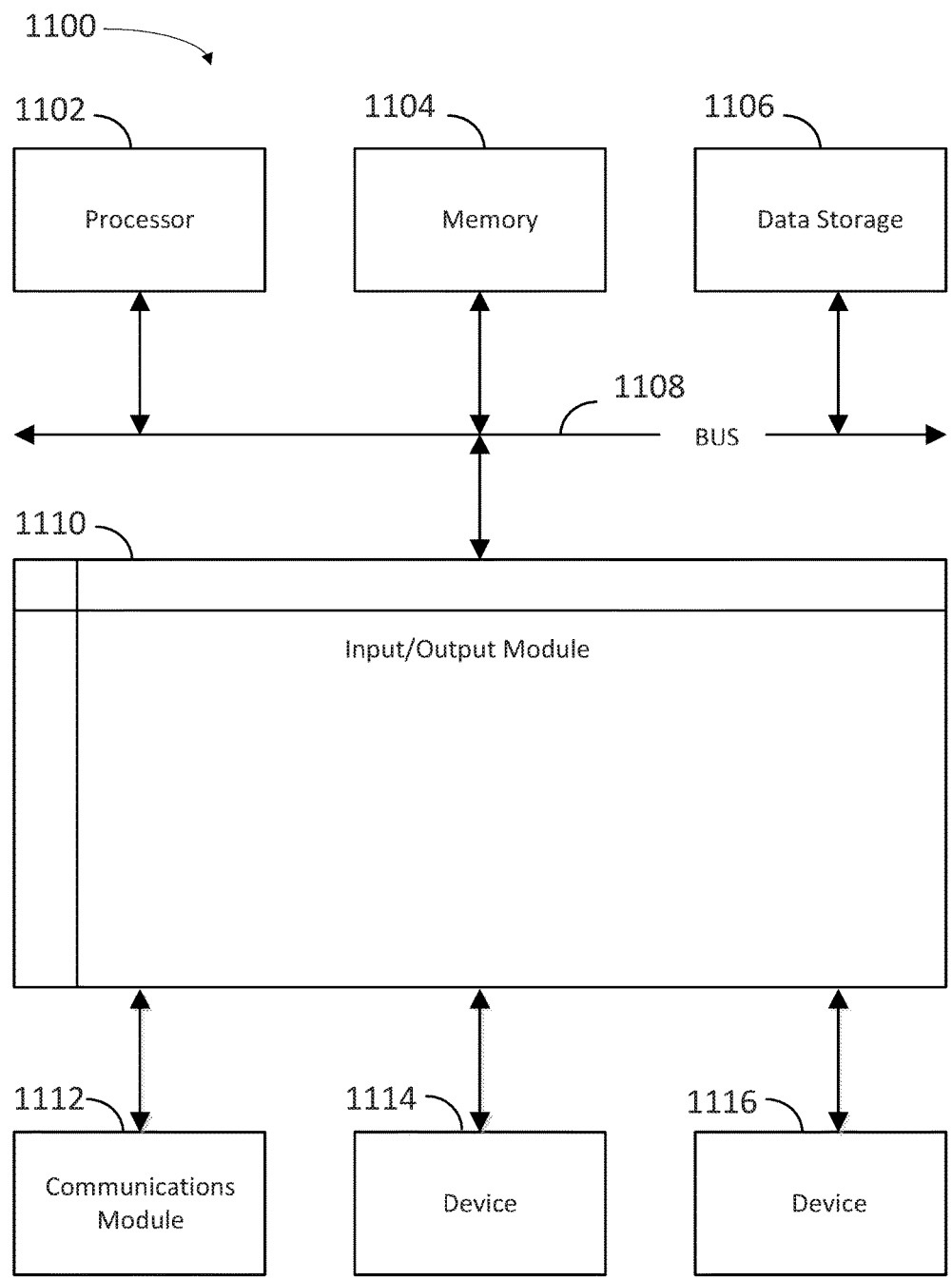
FIG. 11 is a block diagram illustrating an example computer system with which the personal computing device and server of FIG. 1 can be implemented.

FIG. 11 is a block diagram illustrating an example computer system 1100 with which the personal computing device of FIGS. 1-3 can be implemented. In certain aspects, computer system 1100 can be implemented using hardware or a combination of software and hardware, either in a dedicated server, or integrated into another entity, or distributed across multiple entities.

Computer system 1100 (e.g., personal computing devices 120 and servers 110) includes a bus 1108 or other communication mechanism for communicating information, and a processor 1102 (e.g., processor circuit 212) coupled with bus 1108 for processing information. By way of example, computer system 1100 can be implemented with one or more processors 1102. Processor 1102 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1100 includes, in addition to hardware, code that creates an execution environment for the computer program in question, e.g., code that constitutes processor firmware, a protocol stack, a database management system, an operating system, or a combination of one or more of them stored in an included memory 1104 (e.g., memory circuit 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1108 for storing information and instructions to be executed by processor 1102. Processor 1102 and memory 1104 can be supplemented by, or incorporated in, special purpose logic circuitry.

The instructions may be stored in memory 1104 and implemented in one or more computer program products, i.e., one or more modules of computer program instructions encoded on a computer readable medium for execution by, or to control the operation of, the computer system 1100, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 1104 may also be used for storing temporary variable or other intermediate information during execution of instructions to be executed by processor 1102.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1100 further includes a data storage device 1106 such as a magnetic disk or optical disk, coupled to bus 1108 for storing information and instructions. Computer system 1100 is coupled via input/output module 1110 to various devices. The input/output module 1110 is any input/output module. Example input/output modules 1110 include data ports such as USB ports. The input/output module 1110 is configured to connect to a communications module 1112. Example communications modules 1112 (e.g., communications module 218) include networking interface cards, such as Ethernet cards and modems. In certain aspects, the input/output module 1110 is configured to connect to a plurality of devices, such as an input device 1114 (e.g., input device 214) and/or an output device 1116 (e.g., display 206). Example input devices 1114 include a keyboard and a pointing device, e.g., a mouse or a trackball, by which a user can provide input to the computer system 1100. Other kinds of input devices 1114 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1116 include display devices, such as a LED (light emitting diode), CRT (cathode ray tube), or LCD (liquid crystal display) screen, for displaying information to the user.

According to one aspect of the present disclosure, personal computing device 120 can be implemented using a computer system 1100 in response to processor 1102 executing one or more sequences of one or more instructions contained in memory 1104. Such instructions may be read into memory 1104 from another machine-readable medium, such as data storage device 1106. Execution of the sequences of instructions contained in main memory 1104 causes processor 1102 to perform the process steps described herein. One or more processors in a multi-processing arrangement may also be employed to execute the sequences of instructions contained in memory 1104. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 1100 includes servers and personal computer devices, such as servers 110 and personal computing devices 120, described in detail above. A personal computing device and server are generally remote from each other and typically interact through a communication network. The relationship of client and server arises by virtue of computer programs running on the respective computers and having a client-server relationship to each other. Computer system 1100 can be, for example, and without limitation, a desktop computer, laptop computer, or tablet computer. Computer system 1100 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 1102 for execution. Such a medium may take many forms, including, but not limited to, non-volatile media, volatile media, and transmission media. Non-volatile media include, for example, optical disks, magnetic disks, or flash memory, such as data storage device 1106. Volatile media include dynamic memory, such as memory 1104. Transmission media include coaxial cables, copper wire, and fiber optics, including the wires that comprise bus 1108. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   detecting a hardware configuration change of a personal computing device from a first configuration to a second configuration;
   in response to detecting the hardware configuration change to the second configuration, maximizing a plurality of open windows in a user interface displayed by the personal computing device;
   stacking the maximized plurality of open windows for display in the user interface;
   detecting a hardware configuration change of the personal computing device from the second configuration to the first configuration; and
   in response to detecting the hardware configuration change to the first configuration, spreading the plurality of open windows across the user interface displayed by the personal computing device, wherein at least an interactive portion of each of the plurality of open windows is accessible in the displayed user interface.

2. The computer-implemented method of claim 1, wherein the maximized plurality of open windows are stacked in a temporal order with a more recently active window of the plurality of open windows stacked on top of a less recently active window of the plurality of open windows.

3. The computer-implemented method of claim 1, further comprising providing an overview layout control for display in the user interface in response to detecting the hardware configuration change to the second configuration.

4. The computer-implemented method of claim 3, wherein the overview layout control is provided for display in a permanent affordance bar of the user interface.

5. The computer-implemented method of claim 1, wherein detecting the hardware configuration change to the second configuration comprises detecting separation of a keyboard from the personal computing device.

6. The computer-implemented method of claim 1, wherein the first configuration comprises a laptop configuration, and the second configuration comprises one of a tablet configuration, a stand-display configuration or a tent configuration.

7. A personal computing device, comprising:
   a base portion comprising a processor circuit and a memory circuit;
   a display portion comprising a touch screen display; and
   a hinge mechanism coupling the base portion and the display portion,
   wherein the memory circuit stores commands executable by the processor circuit to:
      provide a user interface for display on the touch screen display;
      determine a hardware configuration of the base portion and the display portion; and
      switch the user interface displayed on the touch screen display between a laptop mode and a tablet mode based on the determined hardware configuration,
      wherein the laptop mode of the user interface comprises a plurality of open windows spread across the user interface with an interactive portion of each of the plurality of open windows accessible in the displayed user interface, and
      wherein the tablet mode comprises the plurality of open windows maximized and stacked for display in the user interface.

8. The personal computing device of claim 7, further comprising a sensor, wherein the hardware configuration is determined by the processor circuit based on a signal received from the sensor.

9. The personal computing device of claim 7, wherein the display portion and the base portion form an angle, and wherein the hinge mechanism is operable to position the display portion at an angle with respect to the base portion between 0 degrees and 360 degrees.

10. The personal computing device of claim 9, wherein the personal computing device is determined to be in a first hardware configuration when the angle is less than 180 degrees and a second hardware configuration when the angle is greater than 180 degrees, and
  wherein the user interface is switched to the laptop mode in the first hardware configuration and the tablet mode in the second hardware configuration.

11. The personal computing device of claim 10, wherein the second configuration comprises one of a tablet configuration, a stand-display configuration or a tent configuration.

12. The personal computing device of claim 7, wherein the laptop mode of the user interface further comprises a windows icons menus and pointers (WIMP) mode.

13. The personal computing device of claim 7, wherein the tablet mode further comprises the plurality of maximized open windows stacked in a temporal order for display in the user interface.

14. The personal computing device of claim 7, wherein the tablet mode further comprises an inactive window of the plurality of maximized open windows stacked underneath an active window of the plurality of maximized open windows for display in the user interface.

15. A non-transitory computer-readable medium storing commands that, when executed by a processor circuit in a personal computing device, cause the personal computing device to perform a method comprising:
  detecting a hardware configuration change of a personal computing device from a first configuration to a second configuration;
  in response to detecting the hardware configuration change to the second configuration, setting a user interface displayed by the personal computing device to a tablet mode;
  detecting a hardware configuration change of the personal computing device from the second configuration to the first configuration; and
  in response to detecting the hardware configuration change to the first configuration, setting the user interface displayed by the personal computing device to a windows icons menus and pointers (WIMP) mode.

16. The non-transitory computer-readable medium of claim 15, wherein setting the user interface to the tablet mode comprises:
  maximizing an active window in the user interface; and
  maximizing an inactive window underneath the maximized active window in the user interface.

17. The non-transitory computer-readable medium of claim 15, wherein setting the user interface to the tablet mode comprises:
  maximizing a plurality of open windows in the user interface; and
  stacking the maximized plurality of open windows in a temporal order for display in the user interface.

18. The non-transitory computer-readable medium of claim 15, wherein the WIMP mode comprises a plurality of open windows spread across the user interface with an interactive portion of each of the plurality of open windows accessible in the displayed user interface.

19. The non-transitory computer-readable medium of claim 15, wherein setting the user interface to the tablet mode comprises providing an overview layout control for display in a permanent affordance bar of the user interface.

20. The non-transitory computer-readable medium of claim 15, wherein detecting the hardware configuration change to the second configuration comprises detecting separation of a keyboard from the personal computing device.

* * * * *